United States Patent
Johann et al.

[19]

[11] Patent Number: 6,095,593
[45] Date of Patent: Aug. 1, 2000

[54] ENERGY-ABSORBING COVERING FOR A VEHICLE BODY COLUMN OF A MOTOR VEHICLE

[75] Inventors: Reinhard Duep Johann, Kornwestheim; Michael Menking, Neuhausen, both of Germany

[73] Assignee: Dr. Ing. h.c.F. Porsche AG, Weissach, Germany

[21] Appl. No.: 09/133,821

[22] Filed: Aug. 13, 1998

[30] Foreign Application Priority Data

Aug. 13, 1997 [DE] Germany .................. 197 35 068

[51] Int. Cl.⁷ .................................................. B60R 13/02
[52] U.S. Cl. ..................... 296/189; 296/39.1; 280/751
[58] Field of Search ................................. 296/189, 39.1, 296/203.03; 280/748, 751

[56] References Cited

U.S. PATENT DOCUMENTS

| 5,163,730 | 11/1992 | Welch . | |
|---|---|---|---|
| 5,419,606 | 5/1995 | Hull et al. | 296/146.7 |
| 5,564,744 | 10/1996 | Frost | 280/751 |
| 5,575,500 | 11/1996 | Mimura et al. | 280/751 |
| 5,720,510 | 2/1998 | Daniel et al. | 296/188 |
| 5,725,271 | 3/1998 | Patel et al. | 296/189 |
| 5,741,044 | 4/1998 | Kawai et al. | 296/203 |
| 5,791,716 | 8/1998 | Takagi et al. | 296/39.1 |
| 5,803,532 | 8/1998 | Karuppaswamy et al. | 296/189 |
| 5,836,641 | 11/1998 | Sugamoto | 296/189 |

FOREIGN PATENT DOCUMENTS

| 0 676 315 | 10/1995 | European Pat. Off. . |
|---|---|---|
| 0 716 960 | 6/1996 | European Pat. Off. . |
| 2 728 224 A1 | of 1994 | France . |
| 31 08 759 | 9/1982 | Germany . |
| 195 34 957 C2 | of 1997 | Germany . |
| 2 293 798 | 4/1996 | United Kingdom . |
| 2 308 340 | 6/1997 | United Kingdom . |

*Primary Examiner*—Dennis H. Pedder
*Assistant Examiner*—Mickki Murray
*Attorney, Agent, or Firm*—Evenson, McKeown, Edwards & Lenahan, PLLC

[57] ABSTRACT

An energy-absorbing covering for a body column of a motor vehicle includes on an area situated in the occupant compartment a covering part and an energy-absorbing element, which is arranged between the body column and the covering part. The energy-absorbing element is formed by a hollow-space-bounding support made of sheet metal. So that a lateral bending-away of the energy-absorbing element is avoided even if the energy-absorbing element is acted upon in an unfavorable direction, while the energy-absorbing covering has a construction which is easy to mount, and, in addition, rattling noises in the driving operation are avoided, it is provided that the energy-absorbing element is connected on the side facing the body column at least in areas with a profiled holding rail which, in sections, rests on the body column and is locally fixedly connected with it. The covering part, which is arranged at a distance in front of the energy-absorbing element, is fastened locally to the holding rail or to the body column.

18 Claims, 6 Drawing Sheets

ENERGY-ABSORBING COVERING FOR A VEHICLE BODY COLUMN OF A MOTOR VEHICLE

BACKGROUND AND SUMMARY OF THE INVENTION

This application claims the priority of German patent application No. 197 35 068.2, filed Aug. 13, 1997, the disclosure of which is expressly incorporated by reference herein.

The invention relates to an energy-absorbing covering for a body column of a motor vehicle which is provided on an area of the body column situated in the occupant compartment and includes at least one covering part and an energy-absorbing element arranged between the covering part and the body column, the energy-absorbing element being formed of a hollow-space-bounding support made of sheet metal.

From U.S. Pat. Document No. 5,163,730, an energy-absorbing covering for a body column of a motor vehicle is known which is composed of a covering part and of an energy-absorbing element arranged between the covering part and the body column. The profiled energy-absorbing element constructed in one piece and made of sheet metal, together with the body column situated behind it, forms a closed hollow space and is fixed by means of at least one leg directly on the body column. The other leg of the energy-absorbing element, which has a bent shape on its end side, rests without any attachment on the body column with its free end. In this embodiment, the covering part is supported in sections directly on the one-piece energy-absorbing element and is fixedly connected with it by way of a double-sided adhesive tape or the like.

This arrangement has the disadvantage that, as a result of the unattached resting of the second leg of the energy-absorbing element on the body column, in the event of an unfavorable, that is, diagonal direction force acting upon the energy-absorbing element, the energy-absorbing element may escape to the side and virtually bend away about a hinge axis. This results in a significantly lower energy absorption in the event of a head impact. In addition, the freely resting second leg of the energy-absorbing element may cause undesirable rattling noises in the driving operation. Furthermore, the correct positioning of the energy-absorbing element on the body column and that of the covering on the energy-absorbing element present difficulties during assembly.

It is an object of the invention to improve upon an energy-absorbing covering of the above-mentioned type such that, while the construction is easy to mount, a lateral bending-away of the energy-absorbing element is avoided even when acted upon in an unfavorable direction. In addition, rattling noises are avoided which are otherwise caused by the energy-absorbing covering during the driving operation.

According to the invention, this object is achieved by an energy absorbing covering for a body column of a motor vehicle which is provided on an area of the body column situated in the occupant compartment and includes at least one covering part and an energy-absorbing element arranged between the covering part and the body column, the energy-absorbing element being formed of a hollow-space-bounding support made of sheet metal. The energy-absorbing element is supported on the side fastening the body column at least in a partial area of its longitudinal dimension by a profiled holding rail which rests in sections form-lockingly against the body column and is locally fixedly connected with it. Additional characteristics which further develop the invention in an advantageous manner are described herein.

The principal advantages achieved by the present invention are that, as a result of the arrangement of a profiled holding rail, which is connected at least locally with the two legs of the energy-absorbing element, also in the event of a head impact, when the action takes place in an unfavorable direction, an effective absorption of energy is achieved. Because of the shape of the holding rail, which is adapted in sections to the outer contour of the body column, this holding rail, together with the energy-absorbing element, can be positioned and fastened on the body column in a simple manner. Rattling noises in the driving operation are avoided by the two-sided holding of the energy-absorbing element. The covering part can be fastened in a simple manner by way of plug-type connections on the holding rail or on the body column.

Other objects, advantages and novel features of the present invention will become apparent from the following detailed description of the invention when considered in conjunction with the accompanying drawings.

DETAILED DESCRIPTION OF THE DRAWINGS

Figure 1:
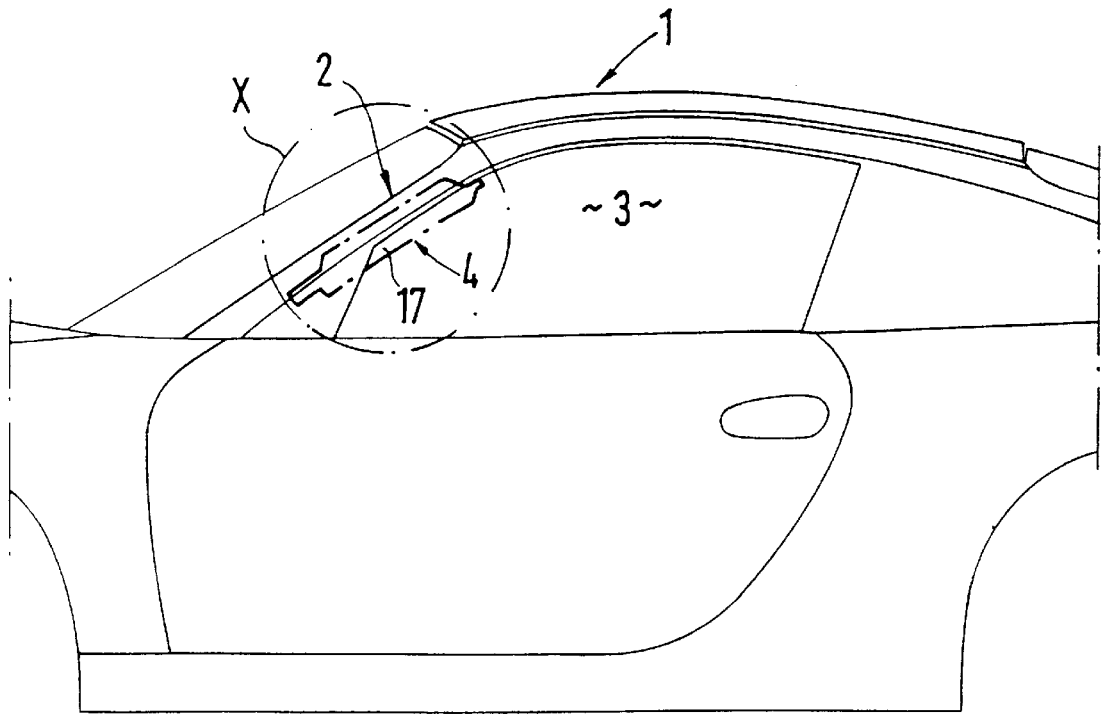
FIG. 1 is a partial lateral view of a passenger car having a body column which is arranged between a windshield and a door window and which is provided on the occupant-compartment-side with an energy-absorbing covering.

The passenger car 1 illustrated in sections in FIG. 1 has a body column 1 which is formed by an A-column 2 and which, on the side facing an occupant compartment 3, is provided with an energy-absorbing covering 4. The energy-absorbing covering 4 considerably reduces the impact values of a vehicle occupant in the event of a head impact. According to FIGS. 3 to 5, the body column 2 is composed at least of one profiled inside panel 5 and one profiled outside panel 6. Also, between the inside panel 5 and the outside panel 6, the body column 2 may have an additional reinforcing panel 7 or a reinforcing tube which is arranged in the interior hollow space of the body column 2 (not shown in detail). The inside panel 5, the reinforcing panel 7 and the outside panel 6 are assembled on flanges 8, 9 by means of suitable processes to form a closed hollow support. The flange 8 is used for receiving a windshield 10 which is held in position by means of an adhesive body 11. On the flange 9, a sealing body 12 is mounted which interacts with a door window 13 or with a door frame. The energy-absorbing covering 4 comprises at least one energy-absorbing element 14 and a covering part 15 facing the vehicle occupant.

Figure 4:
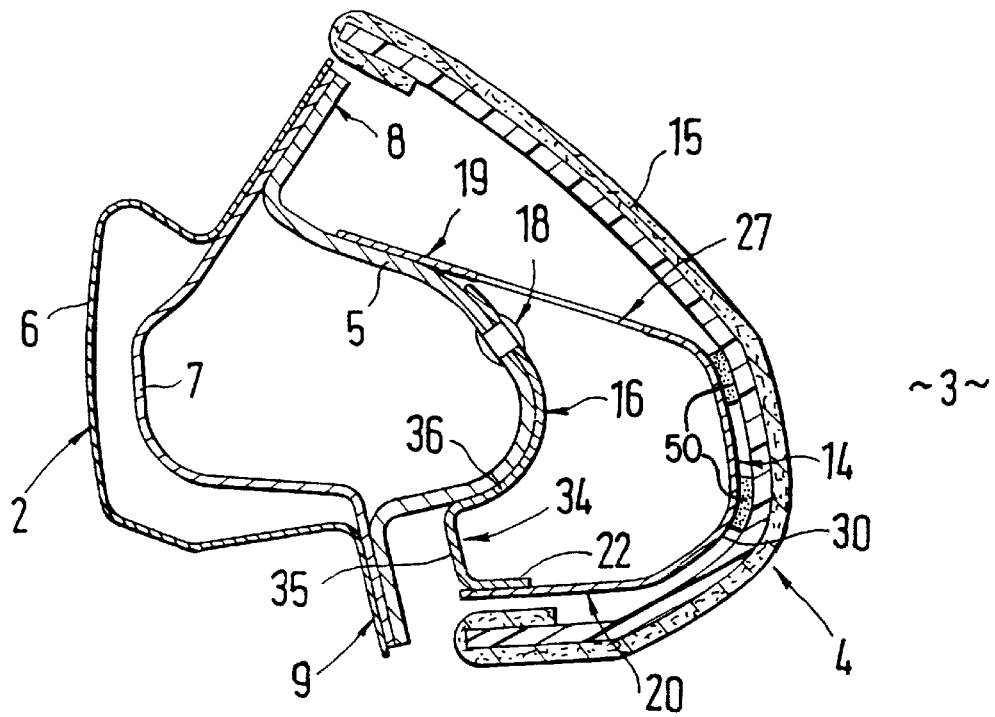
FIG. 4 is an enlarged sectional view according to Line IV—IV of FIG. 2.

According to the invention, the energy-absorbing element 14, which in the cross-sectional view has an approximately U-shaped profile, is connected on the side facing the body column 2 at least in areas with a profiled holding rail 16. The holding rail 16 rests in sections in a form-locking manner on the body column 2 and is locally fixedly connected with it. The holding rail 16 and the energy-absorbing element 14 form a preassembled constructional unit 17 which can be fastened to the inside panel 5 of the body column 2. This can take place by means of riveting, screwing, welding or the like. As an example, FIG. 4 shows a rivet 18 for holding the constructional unit 17 on the body column 2. The holding rail 16 as well as the energy-absorbing element 14 of the constructional unit 17 can be fastened directly on the body column 2.

Figure 5:
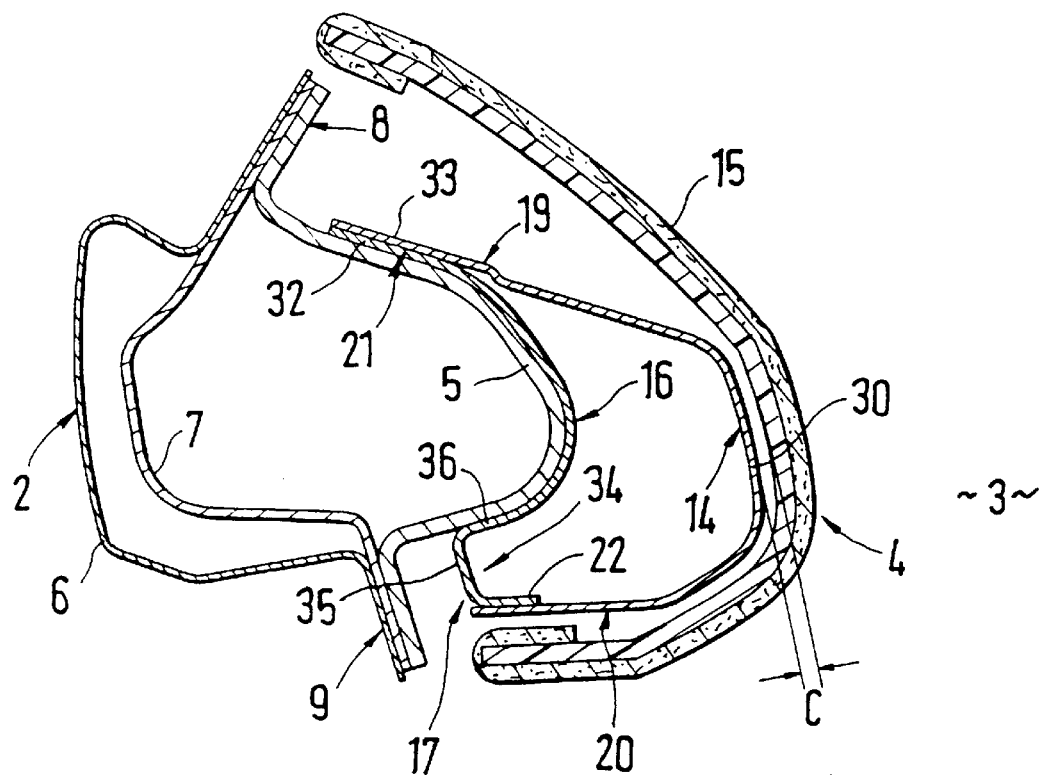
FIG. 5 is an enlarged sectional view according to Line V—V of FIG. 2.
Figure 6:
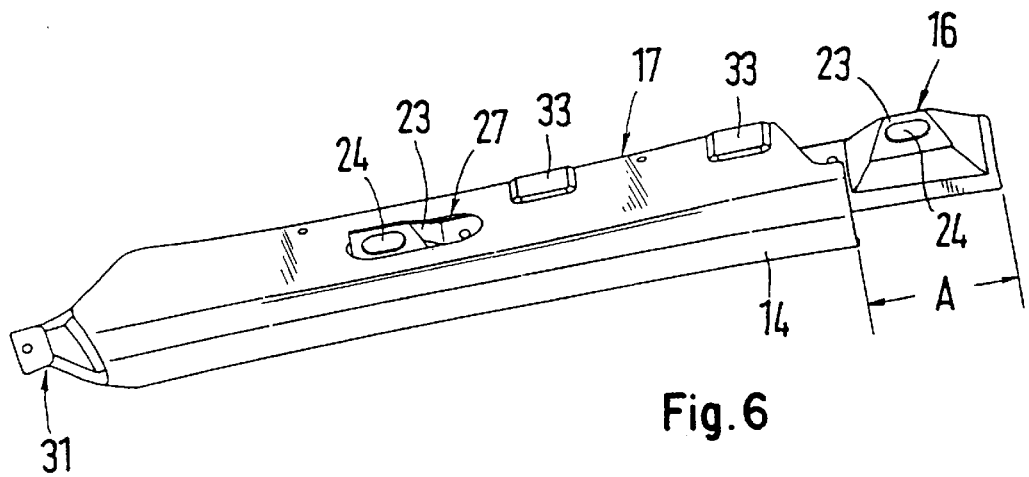
FIG. 6 is a view in the direction of the arrow R of FIG. 3 of the energy-absorbing element and of the holding rail.
Figure 7:
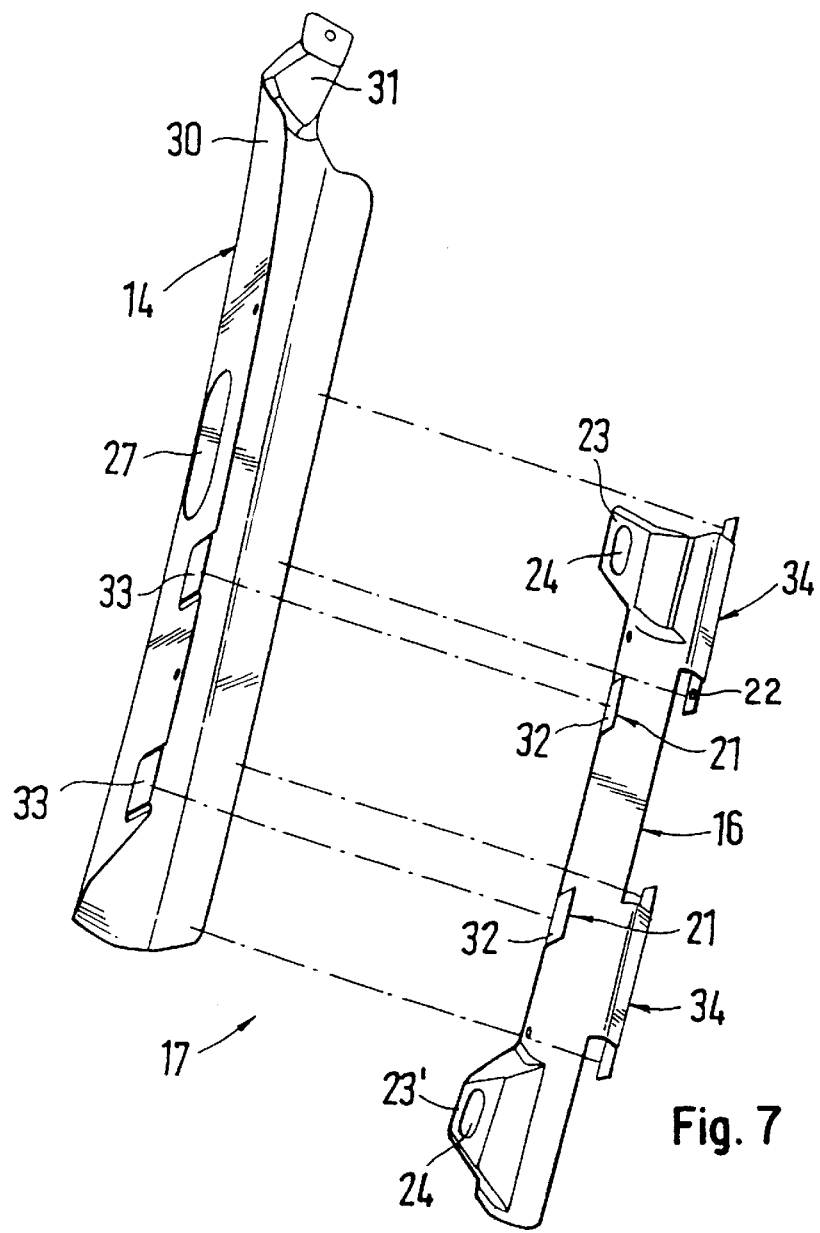
FIG. 7 is an exploded view of the energy-absorbing element and of the holding rail.

The energy-absorbing element 14 has two spaced legs 19, 20 along its whole longitudinal dimension, the free ends of the two legs 19, 20 being locally fixedly connected with interior flanges 21, 22 of the holding rail 16 which point in the same direction (FIG. 5). According to FIG. 7, the flanges 21, 22 of the holding rail 16 are provided only locally. The flanges 21 of the holding rail 16 are formed by projecting rectangular tongues 32 which rest against the interior side of corresponding shaped-out areas 33 of the leg 19 of the energy-absorbing element 14 and are fastened there. In the embodiment, two spaced tongues 32 are provided on the holding rail 16. The flanges 22 of the holding rail 16 each form exterior webs of U-shaped molded-on areas 34, two spaced molded-on areas 34 also being provided on the holding rail 16. Between the U-shaped molded-on areas 34, the holding rail 16 is cut free. Below the lower molded-on area 34, the holding rail 16 is also cut free.

According to FIG. 5, each U-shaped molded-on area 34 is composed of the outer web forming the flange 22, a connection web 35 and an inner web 36, which is connected in one piece to the contour of the holding rail 16. The connection between the holding rail 16 and the legs 19, 20 of the energy-absorbing element 14 takes place in the embodiment by several point-welded connections. Generally, the connection of the holding rail 16 and of the energy-absorbing element 14 takes place by welding, soldering, gluing, forming, throughput joining or the like. The holding rail 16 and the energy-absorbing element 14 can each be made of steel or sheet aluminum.

Figure 2:
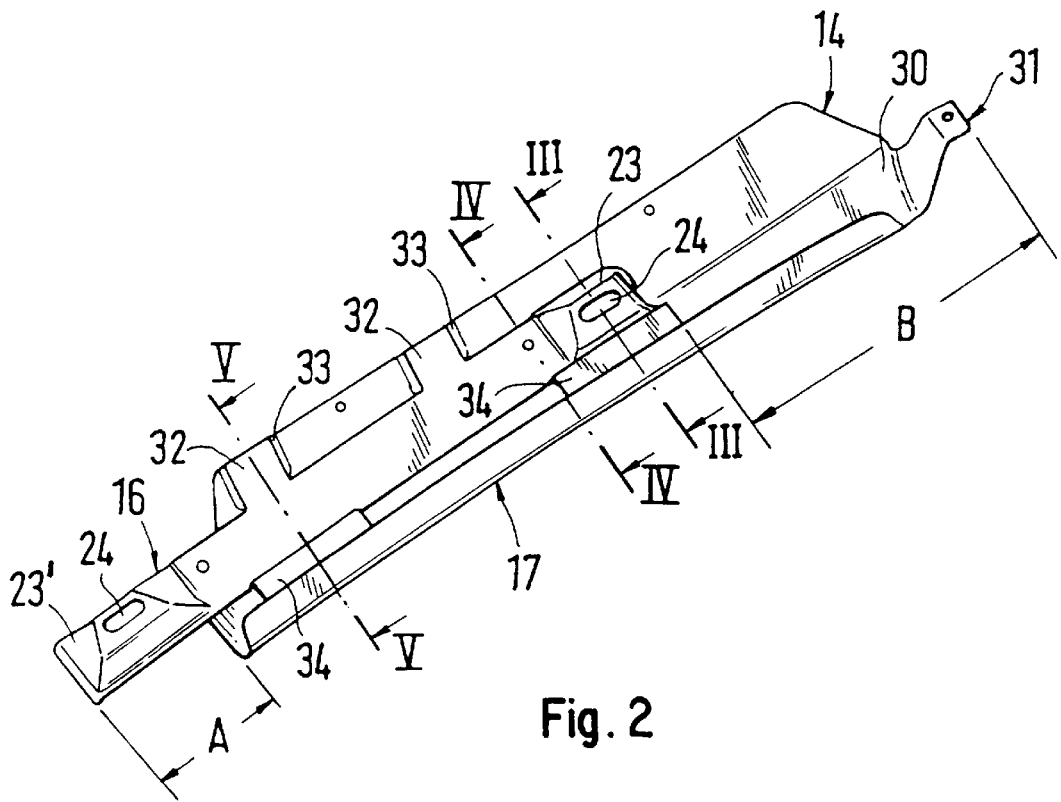
FIG. 2 is an enlarged view of the detail region X of FIG. 1 of the energy-absorbing element and the holding rail of the energy-absorbing covering.
Figure 3:
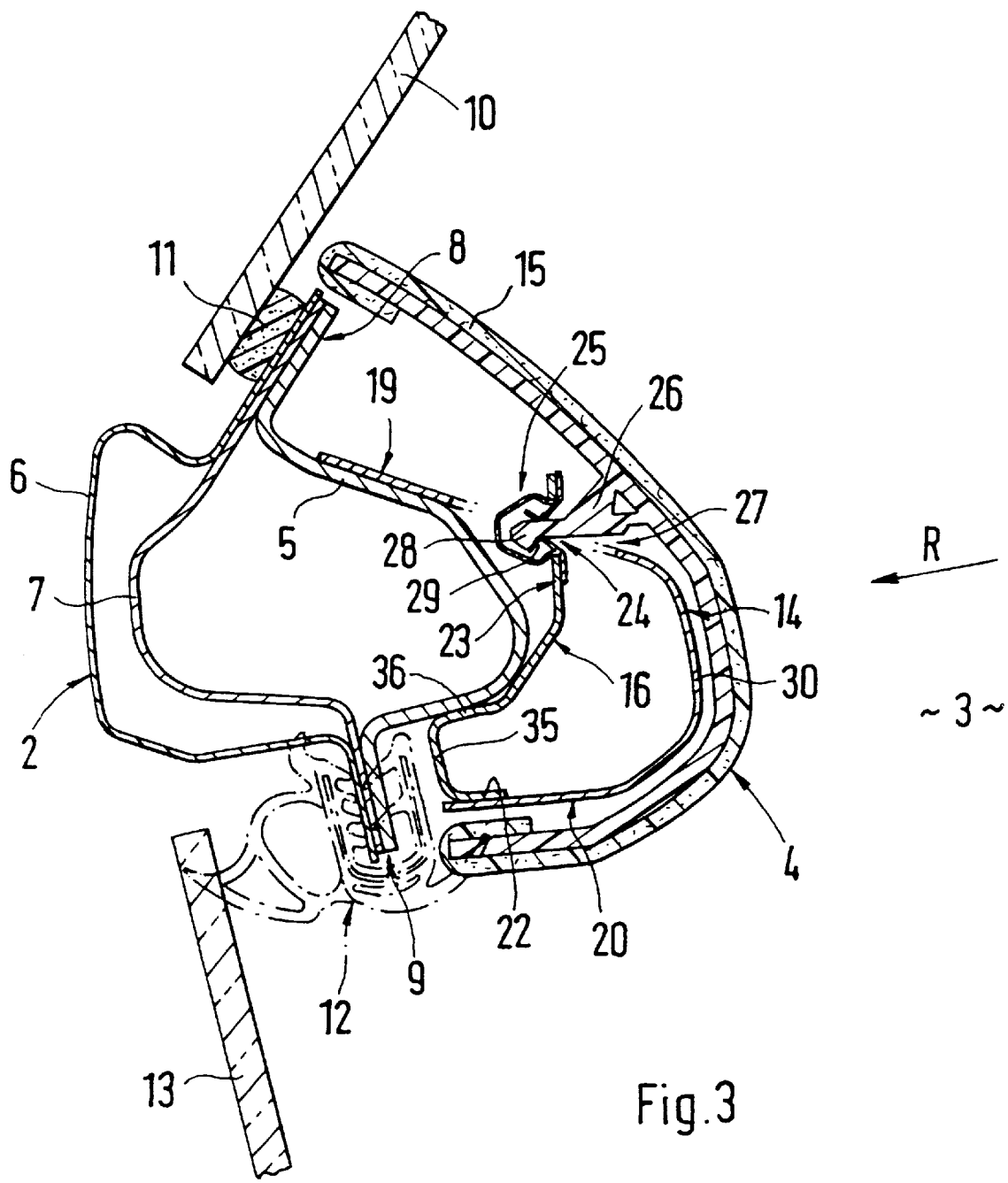
FIG. 3 is an enlarged sectional view according to Line III—III of FIG. 2.

In the embodiment, the holding rail 16 is made of steel plate and the energy-absorbing element 14 is made of sheet aluminum, the holding rail 16 having a larger wall thickness than the energy-absorbing element 14. The wall thickness of both parts is approximately between 0.5 and 2.0 mm and is determined empirically. Corresponding to FIG. 2, the holding rail 16 projects beyond the energy-absorbing element 14 in the downward direction by an extent A. In the upward direction, the energy-absorbing element 14 projects beyond the holding rail 16 by an extent B. The covering part 15 facing the vehicle occupant extends continuously at a distance C (FIG. 5) from the energy-absorbing element 14 and, according to a first embodiment, is only locally fastened to the holding rail 16 (FIG. 3). For this purpose, one pulled-up support flange 23,23' respectively is provided at both ends of the elongated holding rail 16 on the side facing the leg 20 of the energy-absorbing element 14, an oblong hole 24 being formed on each support flange 23,23' into which oblong hole 24 an elastic holding clamp 25 is inserted. A free end of a fastening web 26 of the covering part 15 can be fitted into each holding clamp 25. The lower support flange 23,23' of the holding rail 16 extends outside the energy-absorbing element 14 so that the covering part 15 can be fastened to the holding rail 16 in a simple manner (FIG. 2).

Figure 8:
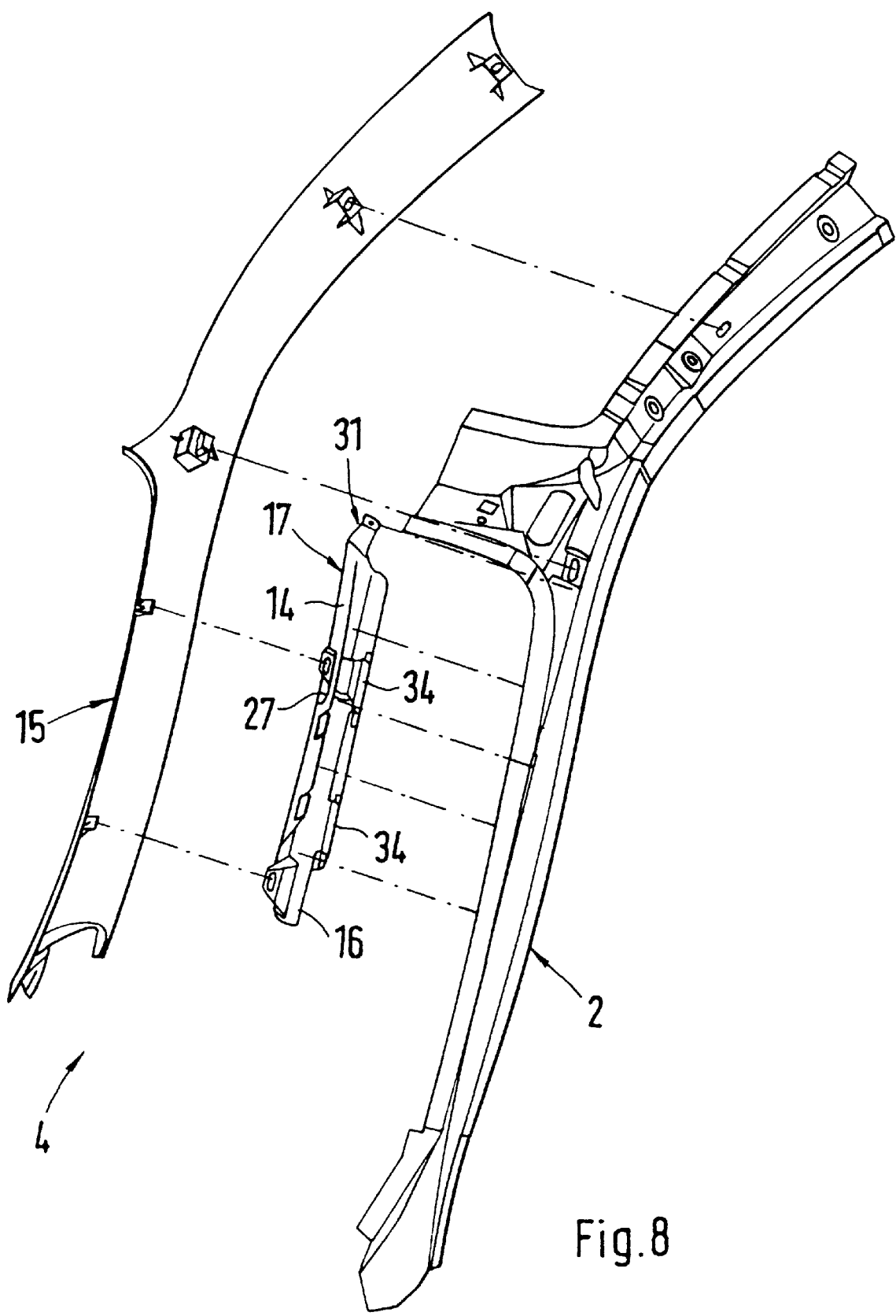
FIG. 8 is another exploded view of the body column, of the prefabricated construction unit formed of the holding rail and of the energy-absorbing element, and of the covering part.

For fastening the holding rail 16 to the body column 2 and for holding the covering part 15 on the upper support flange 23 of the holding rail 16, the energy-absorbing element 14 has an oblong slot opening 27 in this area. The upper support flange 23 penetrates the oblong slot opening 27 of the energy-absorbing element 14 (FIG. 3). The fastening webs 26 on the covering part 15 are only constructed locally in the area of the two spaced support flanges 23,23' of the holding rail 16, each fastening web 26 being aligned approximately perpendicularly to the support flange 23,23'. At the free end of each fastening web 26 at least one laterally projecting holding nose 28 is constructed, which reaches behind a narrowed section of a holding tongue 29. The holding tongue is part of a holding clamp 25 arranged in the opening 24 of the flange 23. The wall section 30 of the energy-absorbing element 14, which extends between the end-side legs 19, 20, extends at a distance C from the covering part 15 disposed in front. To avoid generating noise in the driving operation, intermediate felt layers 50 (see FIG. 4) can be provided locally between the covering 15 and the element 14. According to FIGS. 2, 7 and 8, a bent holder 31 can be provided for the additional fastening of the component 17 on the upper end of the energy-absorbing element 14, which holder 31 can be fastened to the inside panel 5 of the body column 2. This can take place by riveting or screwing. The holder 31 is constructed in one piece with the wall section 30 of the energy-absorbing element 14.

In the described embodiment, the energy-absorbing covering 4 according to the invention is provided on an A-column. However, it may also be arranged on a B-, C-, D-column or on lateral roof frame rails of a vehicle.

Figure 9:
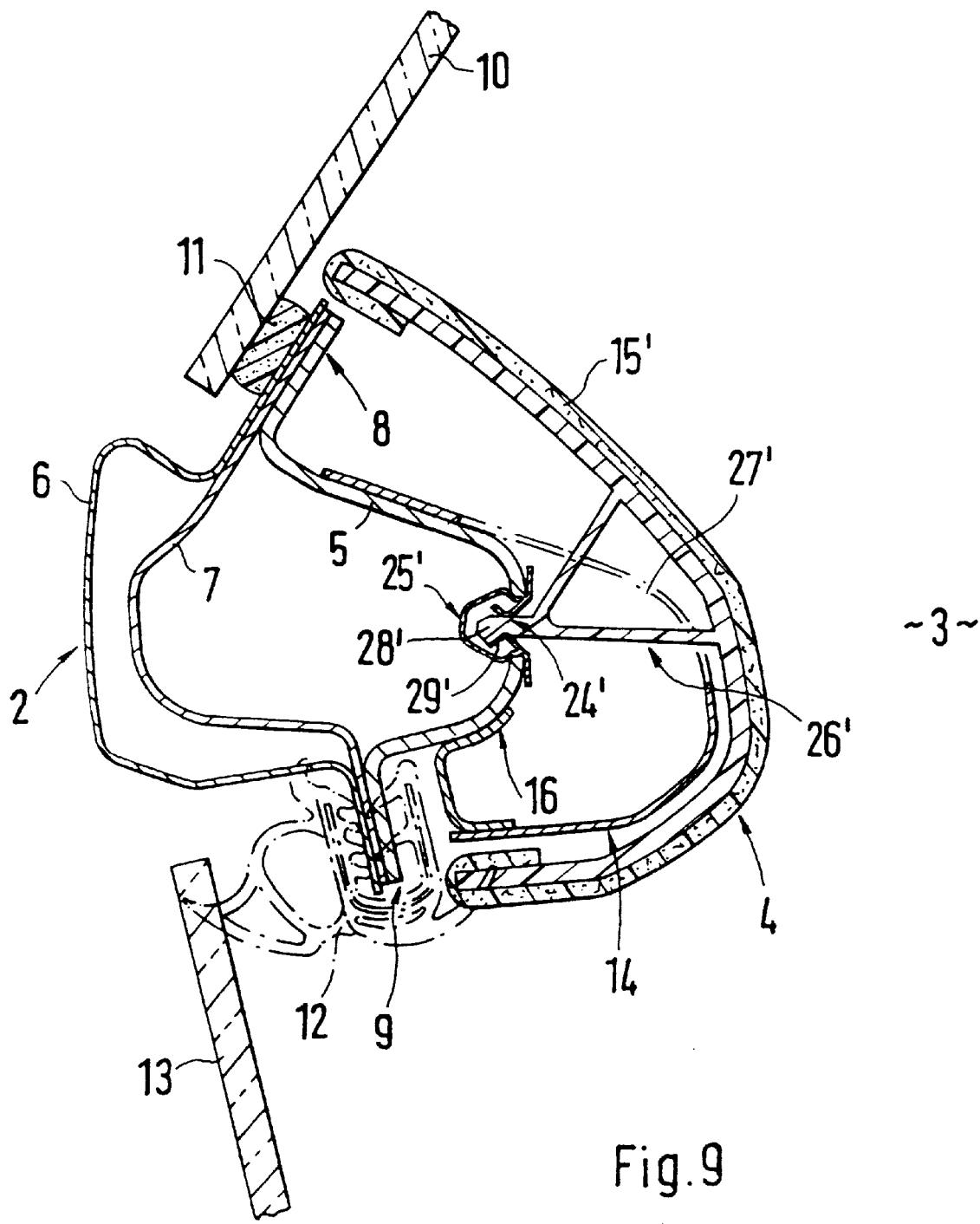
FIG. 9 is a sectional view similar to FIG. 3, in this case, the covering part being fastenable to the body column.

FIG. 9 shows a second embodiment for fastening a covering part 15'. In the case of this arrangement, the covering part 15' is fastened locally on the body column 2. A fastening web 26' of the covering part 15 penetrates an oblong slot opening 27' of the energy-absorbing element 14. The fastening web 26' is aligned approximately perpendicularly to the body column 2 in the area of the mounting surface. According to FIG. 9, an elastic holding clamp 25' is inserted into an oblong hole 24' of the inside panel 5 of the body column 2, in which case a laterally projecting holding nose 28' of the fastening web 26' reaches behind a holding tongue 29' of the holding clamp 25'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy-absorbing covering for a body column of a motor vehicle, said covering being provided on an area of the body column situated in an occupant compartment of the motor vehicle, comprising:

a covering part;

an energy-absorbing element arranged between the covering part and an inner panel of the body column, the energy-absorbing element having a hollow interior space and being made of sheet metal; and a profiled holding rail, said energy absorbing element being supported at opposite ends on a side facing the body column over at least a part of its length by said profiled holding rail;

wherein said profiled holding rail abuts areas of the inner panel form-lockingly along a substantial width of the holding rail and is locally fixedly connected with the inner panel of the body column.

2. Energy-absorbing covering according to claim 1, wherein the energy-absorbing element and the holding rail form a prefabricated constructional unit.

3. Energy-absorbing covering according to claim 1, wherein in a cross-sectional view, the energy-absorbing element has an approximately U-shaped profile having two legs, free ends of the two legs respectively being locally connected with respective interior flanges of the holding rail, each associated free end and interior flange extending in the same direction.

4. Energy-absorbing covering according to claim 2, wherein in a cross-sectional view, the energy-absorbing element has an approximately U-shaped profile having two legs, free ends of the two legs respectively being locally connected with respective interior flanges of the holding rail, each associated free end and interior flange extending in the same direction.

5. Energy-absorbing covering according to claim 3, wherein the energy-absorbing element is connected at a locally defined area with the holding rail by one of welding, soldering, gluing, forming and the like.

6. Energy-absorbing covering according to claim 1, wherein the holding rail and the energy-absorbing element are fastened to the body column by one of riveted, welded and screwed connections.

7. Energy-absorbing covering according to claim 1, wherein the holding rail is made of one of sheet aluminum and steel plate and the energy-absorbing element is made of one of sheet aluminum and steel plate, a thickness of the metal sheets amounting to approximately between 0.5 and 2.0 mm.

8. Energy-absorbing covering according to claim 1, wherein the holding rail projects beyond the energy-absorbing element in a downward direction by a defined extent.

9. Energy-absorbing covering according to claim 1, wherein the energy-absorbing element projects behind the holding rail in an upward direction by a defined extent.

10. Energy-absorbing covering according to claim 1, wherein the covering part, which is arranged at a distance in front of the energy-absorbing element, is fastened to the holding rail at a locally defined area.

11. Energy-absorbing covering according to claim 1, wherein the covering part, which is arranged at a distance in front of the energy-absorbing element, is fastened to the body column at a locally defined area.

12. Energy-absorbing covering according to claim 1, wherein at least one oblong slot opening is constructed on the energy-absorbing element, said slot allowing the holding rail to be fastened to the body column and the covering part to be fastened to one of the holding rail and the body column.

13. Energy-absorbing covering according to claim 1, wherein one support flange respectively having an oblong hole is constructed on both elongated ends of the holding rail, into which oblong hole an elastic holding clamp is inserted, a free end of a fastening web of the covering part being insertable into each holding clamp.

14. Energy-absorbing covering according to claim 13, wherein an upper support flange of the holding rail projects through the oblong slot opening of the energy-absorbing element.

15. Energy-absorbing covering according to claim 1, wherein fastening webs of the covering part are aligned approximately perpendicularly to a bent support flange of the holding rail.

16. Energy-absorbing covering according to claim 1, wherein a fastening web of the covering part projecting through an oblong slot opening of the energy-absorbing element can be fitted into a holding clamp, the holding clamp being inserted into an oblong hole of an inside panel of the body column, the holding clamp having a holding tongue with a narrowed section, behind which narrowed section a projecting holding nose of the fastening web reaches when the covering part is mounted.

17. Energy-absorbing covering according to claim 13, wherein each fastening web has on its free end a locally projecting holding nose, and wherein each holding clamp includes a holding tongue having a narrowed section, said projecting holding nose reaching behind the respective holding tongue.

18. Energy-absorbing covering according to claim 1, wherein intermediate felt layers for avoiding rattling noises are placed between the covering part and the energy-absorbing element.

* * * * *